TELEVISION APPARATUS AND METHOD FOR PHASE-SHIFT SCANNING

Filed Feb. 28, 1950 2 SHEETS—SHEET 1

INVENTOR
P.M.G. Toulon
BY Moore & Hall
ATTORNEYS

TELEVISION APPARATUS AND METHOD FOR PHASE-SHIFT SCANNING

Filed Feb. 28, 1950 2 SHEETS—SHEET 2

INVENTOR
P. M. G. Toulon

BY Morton & Hall

ATTORNEYS

Patented Dec. 23, 1952 2,623,196

UNITED STATES PATENT OFFICE 2,623,196

TELEVISION APPARATUS AND METHOD FOR PHASE-SHIFT SCANNING

Pierre Marie Gabriel Toulon, New York, N. Y., assignor to Products and Licensing Corporation, New York, N. Y., a corporation of Delaware Application February 28, 1950, Serial No. 146,820

6 Claims. (Cl. 315—26)

The present invention relates to the control of the deviation of the electron beam in a cathode ray tube.

The invention applies particularly to television and is of especial value in color television apparatus and systems.

It is well known that the exploration of all points of a television screen surface can be made in various ways. In the most simple process, all the points of each line are successively and continuously explored. In another classical process, called "line interlaced scanning" the odd lines of the first frame are explored sequentially and afterwards the even lines are explored in a second scanning. In another process, "dot interlaced scanning," instead of scanning all successive points of each line, the cathode ray beam explores individual elemental areas or points in groups of six, nine, twelve or sixteen areas per group for each frame, and afterwards the other points of each group are reached in the course of successive scannings of the picture.

The new control process of the electron beam according to the invention, is particularly useful to the application of dot interlaced scanning. The deflection of the cathode ray is usually obtained magnetically or electrostatically by means of a sawtooth generator. The frequency of such a generator is synchronized by synchronizing signals, line or image, sent generally through the same channel, and separated from the video signals through its characteristics, namely relative amplitude or sign. As the deviation of the cathode ray beam is uniform, if one is to obtain dot interlace scanning, it is necessary to modulate the electron gun and to suppress or diminish the beam intensity during the time between the passage from one point or elemental area to another. The result is that the average intensity of the light is very low and the light efficiency of the tube is poor.

According to the invention, the new process overcomes these difficulties and permits the beam to remain on each point an appreciable time with an extremely rapid displacement of the spot during the transient time. As such transient time may be reduced to as low as two per cent it follows that with the present invention the beam may be effective in providing image producing light on the screen as much as ninety-eight per cent of the time as compared with only twenty-five per cent previously.

The invention consists of combining a classical sawtooth generator of large amplitude and of relatively low frequency as formerly utilized with a second sawtooth generator of high frequency, low amplitude and of an opposite sign so as to hold the beam on an elemental area most of the available time and to produce, at a predetermined sequential period of time (multiple of the low sawtooth frequency scanning), a very rapid deflection to the next elemental area to be explored.

It is an object of the invention to obtain dot interlace scanning by means of two saw tooth generators having fractionally related frequencies and connected to opposite deflecting plates or combined on one of the plates.

If the deflection is made electromagnetically, the process consists in applying in the same or in two parallel deflecting coils sawtooth currents of opposite signs and of frequencies which are widely different. In the case of an electrostatic deviation, the normal sawtooth voltages are applied to one plate and the complementary voltage of a high frequency sawtooth is applied to the other plate. The apparent discontinuous movement of the spot can be realized either horizontally and vertically or both ways. According to a particular improvement of the invention the origin or beginning of the sawtooth of high frequency can be shifted from that of a low frequency sawtooth. The phase shift can be changed at the beginning of the frame or at the beginning of the line. This process produces a dot interlaced scanning. According to the invention this dot interlaced process is used for color television and particularly for the three color television system. The process according to the invention permits spotting or holding of the beam as a function of time on the parts of the screen where elementary filters or dots of color phosphors are positioned so that the spot appears to be of one color or of another. This color produced by filters or phosphors can be disposed in the form of parallel colored bands or in form of a check pattern.

According to a particular improvement of the invention, the irregular movement of the spot and the line interlace are combined with a cross motion of variable values of amplitude and phase shift so that a "knight's move" type of scanning is obtained as disclosed in U. S. Patent 2,479,880.

The process and apparatus utilized in the application of the invention will be better understood from the following description which is to be taken as illustrative and not as limiting. In the drawings like numerals refer to like parts throughout.

Figure 1:
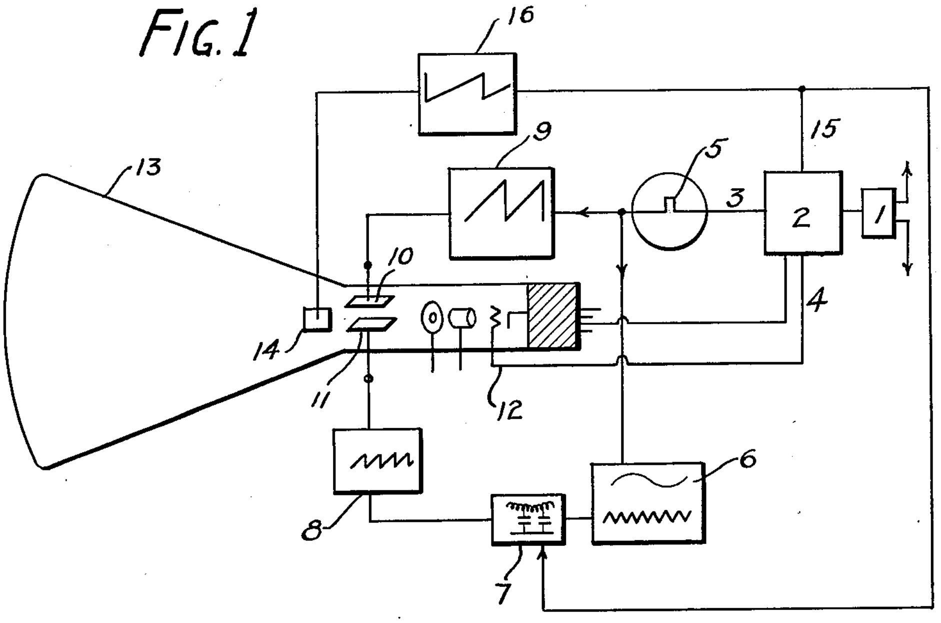
Figure 1 is a schematic general outline circuit for practicing the invention.

In Fig. 1 the usual video set 1 receives signals from a di-pole antenna or the like and is connected to a separator 2 which provides a video frequency at 4, a level line signal at 3 and an end image signal at 15. Line signal 3 is supplied to the usual sawtooth generator 9 which it synchronizes with the transmitter. The output of sawtooth generator 9 is applied to deflection plate 10 of cathode ray tube 13.

The end of image signal 15 is applied to a second sawtooth generator 16 which is in turn connected to deflection plate 14 of tube 13. Video frequency signal 4 is channeled to the grid 12 of the electron gun of C.-R. tube 13 and continuously modulates the intensity of the beam except where the signal is modulated to cut-off at the transmitter.

Line signal 3 is utilized to synchronize a multiplier 6. For example, if the number of lines of a frame is 819 and the number of elemental areas or points on each line is 900, the multiplication may be 300 for a three color system. As will be seen below the multiplication is preferably 300 plus a small proper fraction such as ½, ⅓, ¼, or ⅕.

Multiplier 6 is connected to a sawtooth generator 8 through a phase shift device such as delay line 7. The output of multiplier 6 synchronizes generator 8. The output of generator 8 is applied to the second deflection plate 11 of tube 13. Generators 8 and 9 are mutually adjusted to have voltages of the same value and of the same polarity with respect to ground. They are also adjusted with respect to time. Under these conditions, the difference of potential between plates 10 and 11 is maintained unchanged during the slow variation of the sawtooth of generator 8 and is abruptly modified at each line of relaxation of the higher frequency generator 9.

Figure 2:
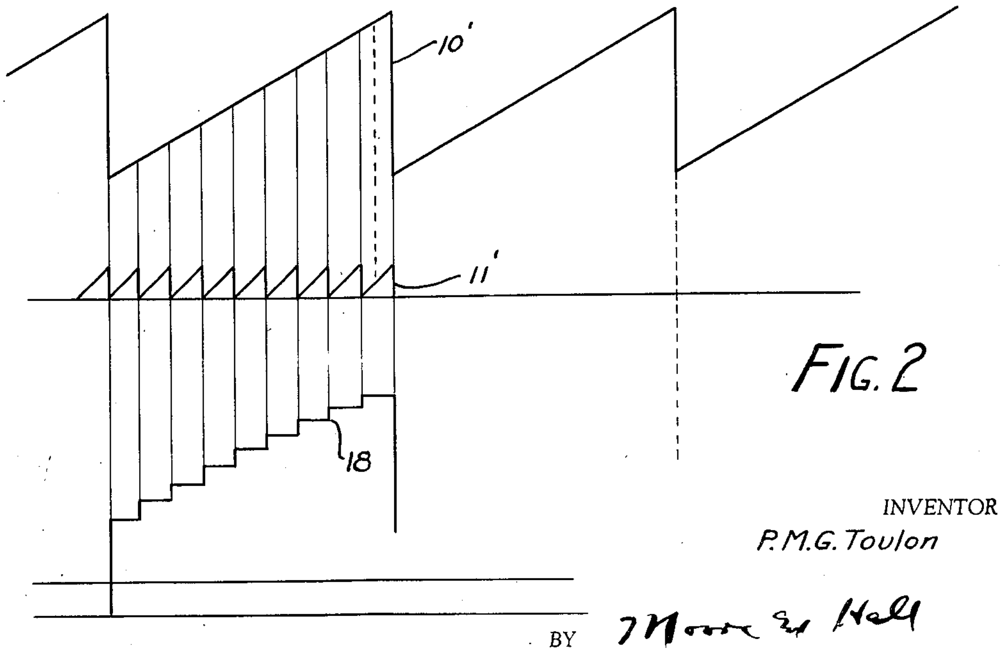
Figure 2 is a graph showing, as a function of time, the voltages in different parts of Fig. 1 and the resulting deflection of the beam spot.

An illustration of voltage gradients is shown clearly in Fig. 2 which illustrates the voltage as a function of time for different parts of the Fig. 1.

10′ is the voltage applied to the plate 10.

11′ is the voltage applied to the plate 11.

The resulting difference of voltage and correspondingly the electrostatic field between plates 10 and 11 is the difference between the two curves 10′ and 11′. It is the step-by-step curve of increasing value 18.

As a result of this arrangement, the flying spot is maintained at the same location of the screen during each voltage rise 10′ of the sawtooth generator 8 and moves very rapidly at the end of each sawtooth, from one location to the other where it is again maintained for the same duration and so on across the screen.

According to an improvement of the invention, it is possible to change the sequence of points of impact of the beam. This result is obtained in one form by the introduction of retarding means of producing a phase shift 7 on the line connecting the multiplier 6 to the sawtooth generator or relaxator 8. The result of this delay line 7 is shown in the Fig. 3, which illustrates the voltage changes of deflection plates 10 and 11 as a function of time.

Figure 3:
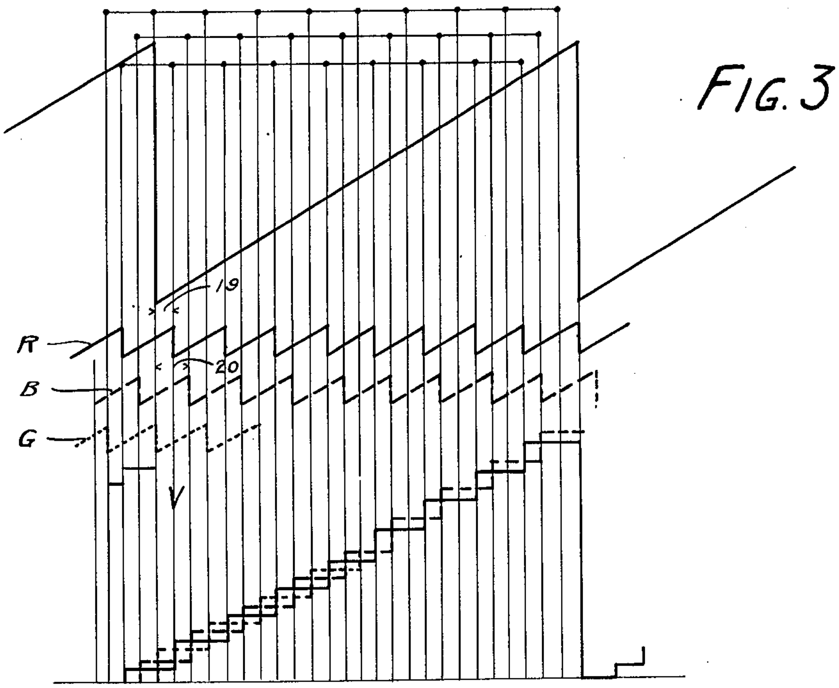
Fig. 3 is a graph showing the voltages and deviations in the case of a variable phase shift between the origins of the high and the low frequency sawtooth waves according to the invention.
Figure 4:
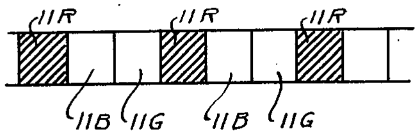
Fig. 4 is a fragmentary diagrammatic showing of the screen scanning resulting from the combined deflections according to the invention.

If the phase shift is the single step 19, the curve 11R creates a voltage difference between plates 10 and 11, with steps for values causing beam locations other than such as shown by G in which the phase shift is zero. If the phase shift is 20, the curve 11B creates another voltage differential with steps having another location and so on. In the particular case where the phase shift is zero for the curve 11G, ⅓ of the sawtooth for the curve 11R and ⅔ of the sawtooth for 11B it is possible to obtain a dot interlaced scanning of three points. This form of scanning is particularly valuable for a three color television process. In the present discussion R, B and G represent red, blue and green respectively. The combined results of this action on plate 10 in connection with action on plate 11 appears on the screen as shown in Fig. 4. In this figure, the first scanning corresponds to the points 11G, the second with a phase shift of 19 in Fig. 3 to the shaded points 11R, and the third with a phase shift of 20 to points 11B.

It is possible to control the phase shift so as to move the beam automatically without using a phase shift delay line 7, if the end of line signal 5 and the multiplier 6 are not frequencies which are multiples of one another, but have a relation which shifts the beam a fraction of a unit area to which may be added one or more whole unit area widths. For example, if the frequency of multiplier 6 is 300—⅓ times the frequency of end of line signal 5, at each end of line there is a displacement of the explored points by one third of their spacing the same as shown in Figs. 3 and 4.

It is possible to choose the number of lines of the image such that the phase shift in the last line at the end of the image causes the first dot of the following image to be shifted by one width with respect to its previous location as shown in Fig. 4 where 11B and 11G are in successive images.

Figure 5:
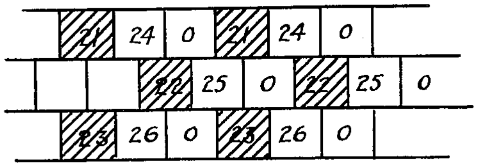
Fig. 5 is a fragmentary diagrammatic showing of screen scanning in which phase-shift is employed.

A similar result appears on the screen in Fig. 5 for a multiple of 300 plus one-half. The points explored at the first line are shaded areas 21, 21, at the second 22, 22, at the third 23, 23 these points are not one under the other but are shifted one and one half points between the other.

If the number of lines of the image is a multiple of three to which is added one unit, the points scanned are shifted automatically from the preceding frame at the end of exploration of the image and the points explored in the following image are the crossed areas 24, 24 for the first line, 25, 25 for the second line and so on 26 and 26 etc. At the following scanning of the image, the points will automatically be shifted again and the elements with a circle are explored in succession. After this first cycle it is repeated automatically.

Multiplier 6 may work on a multiplication factor of 300 plus any small proper fraction such as ½, ⅓, ¼, and so on. The use of ⅓ may introduce a color line in a three color system. Accordingly ½ or ¼ are preferred in such a system. The smaller fractions lengthen the cycle of recurrence and increase the number of elemental areas in a group.

In the preceding embodiments of the invention, the lines are scanned in succession. The same process may be used in a system of interlaced line scanning to great advantage with the apparent result of skip location such as obtained in the "knight's move" as disclosed in the above cited application.

For color television, employing dot interlace, this process allows for control of color flicker, color cross talk, and yields a better blending result.

I claim:

1. In an electron beam scanning system, an explored surface defined by a plurality of groups of elemental areas, means for generating an electron scanning beam, means for deflecting said beam, means connected to said deflecting means for holding said beam on an elemental area, said holding means and said deflecting means being so timed that at least one elemental area in each of said groups is scanned during each scanning of said surface and that different elemental areas in each of said groups are scanned during successive scannings of said surface and the beam is held on each elemental area for a period longer than the time expended in deflecting the beam from one elemental area to another and phase shift means connected to shift periodically the local position of the beam by a partial step whereby the space between adjacent dots remains the same, but the position of the dots is shifted slightly to yield dot interlace scanning.

2. In combination, a television receiver comprising a video unit, a separator unit connected thereto, a cathode ray tube, connected to said separator unit, two wave generators connected to the beam deflection means of said tube, one of said generators producing a wave of relatively low frequency and the other generator producing a wave of relatively high frequency and phase shift means connected to one of said generators to shift periodically the relation between the high and low frequencies whereby the electron beam of said tube is held momentarily on an elemental area of the face of said tube, periodically jumps with high speed to other elemental areas and periodically shifts position by partial steps with the space between adjacent dots for selected sequences remaining the same to yield dot interlace scanning.

3. The combination set forth in claim 2, said phase shift means connected to the generator producing the relatively high frequency whereby the space relation of the high and low frequencies is changed by a partial step at the beginning of each of a series of sequences and dot interlaced scanning of three points is obtained.

4. The combination set forth in claim 3, multiplier means connected to said high frequency generator and having a multiplication factor of at least one hundred plus a proper fraction.

5. In a three color television system, a cathode ray tube having beam deflection means, two wave generators connected to said beam deflection means, said generators producing low and high frequency waves with respect to each other, the frequency of said high frequency generator being a mixed number and means connected to one of said generators to change periodically the phase relation of said waves by a partial step at the beginning of each of a series of selected sequences whereby successive sequences begin with a different color.

6. The combination set forth in claim 5, the fractional part of said mixed number being other than one third.

PIERRE MARIE GABRIEL TOULON.

REFERENCES CITED

The following references are of record in the file of this patent:

UNITED STATES PATENTS

| Number | Name | Date |
|---|---|---|
| 2,143,933 | Barthelemy | Jan. 17, 1939 |
| 2,250,819 | Wolf | July 29, 1941 |
| 2,328,248 | Andrieu | Aug. 31, 1943 |
| 2,368,448 | Cook | Jan. 30, 1945 |
| 2,385,563 | Beers | Sept. 25, 1945 |
| 2,402,270 | Altman | June 18, 1946 |
| 2,406,382 | Kellogg | Aug. 27, 1946 |
| 2,414,939 | Fitch | Jan. 28, 1947 |
| 2,426,201 | Grieg | Aug. 26, 1947 |
| 2,439,324 | Walker | Apr. 6, 1948 |
| 2,465,355 | Cook | Mar. 29, 1949 |
| 2,474,266 | Lyons | June 28, 1949 |
| 2,479,880 | Toulon | Aug. 23, 1949 |
| 2,501,857 | Stewart | Mar. 28, 1950 |